United States Patent
Urbain et al.

(10) Patent No.: US 8,404,072 B2
(45) Date of Patent: Mar. 26, 2013

(54) METALLIZED POLYMERIC FILMS

(75) Inventors: Laurence D. Urbain, Gorcy (FR); Christophe J. Maertens, Verneuil Grand (FR); George F. Cretekos, Farmington, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 13/187,868

(22) Filed: Jul. 21, 2011

(65) Prior Publication Data

US 2011/0308719 A1    Dec. 22, 2011

Related U.S. Application Data

(62) Division of application No. 11/521,656, filed on Sep. 15, 2006, now Pat. No. 8,048,532.

(51) Int. Cl.
  *B32B 38/08* (2006.01)
  *B32B 15/085* (2006.01)
  *H05H 1/00* (2006.01)
(52) U.S. Cl. ............ 156/272.6; 427/537; 428/461
(58) Field of Classification Search ............ None
  See application file for complete search history.

(56) References Cited

U.S. PATENT DOCUMENTS

| | | | |
|---|---|---|---|
| 5,698,317 A | 12/1997 | Kurokawa et al. | |
| 5,725,962 A | 3/1998 | Bader et al. | |
| 5,900,294 A | 5/1999 | Murschall et al. | |
| 6,033,786 A | 3/2000 | Fatica et al. | |
| 6,399,159 B1 * | 6/2002 | Grace et al. | 427/536 |
| 6,420,041 B1 | 7/2002 | Amon et al. | |
| 6,649,279 B2 | 11/2003 | Migliorini et al. | |
| 6,723,431 B2 | 4/2004 | Mallory et al. | |
| 6,773,818 B2 | 8/2004 | Cretekos et al. | |
| 6,863,964 B2 | 3/2005 | Migliorini et al. | |
| 2003/0104125 A1 | 6/2003 | Busch et al. | |
| 2008/0318036 A1 | 12/2008 | Nassi et al. | |

FOREIGN PATENT DOCUMENTS

| | | |
|---|---|---|
| DE | 103 07 133 | 9/2004 |
| EP | 0 669 348 | 8/1995 |
| EP | 0 787 582 | 8/1997 |
| EP | 0 981 440 | 3/2000 |
| EP | 1 634 699 | 3/2006 |
| WO | WO 01/53077 | 7/2001 |
| WO | WO 02/098656 | 12/2002 |
| WO | WO 03/072357 | 9/2003 |
| WO | WO 2004/091884 | 10/2004 |
| WO | WO 2006/027033 | 3/2006 |

OTHER PUBLICATIONS

Campbel et al., "Improved Barrier Properties with Metallized Films from Corona Process Improvements and From Copolymer Characteristics", Polymers, Laminations & Coating Conference, Aug. 30, 1998-Sep. 3, 1998, San Francisco, CA, pp. 385-396.

* cited by examiner

*Primary Examiner* — Monique Jackson
(74) *Attorney, Agent, or Firm* — Kevin M. Faulkner

(57) ABSTRACT

Disclosed herein is an improved, metallized polymer film and method for preparing the same. Such films comprise a) at least one treated polymeric skin layer comprising butylene, and b) a metal layer deposited onto at least one surface of this polymeric skin layer. The polymeric skin layer can comprise a propylene-butylene copolymer or an ethylene-propylene-butylene terpolymer, with this copolymer or terpolymer containing from about 4 wt % to about 12 wt % of butylene. The polymeric skin layer is preferably preconditioned by subjecting an outermost surface thereof to plasma treatment which facilitates the deposition thereon of a strongly adhering metal layer which is preferably aluminum. The resulting multilayer films exhibit metal adhesion bond strength of at least about 100 grams/25 mm. These films will preferably also exhibit a Water Vapor Transmission Rate of from about 0.05 to about 0.2 $g/m^2/24$ hour, and an Oxygen Transmission Rate of from about 5.0 to about 20 $cm^3/m^2/24$ hour.

18 Claims, No Drawings

METALLIZED POLYMERIC FILMS

CROSS-REFERENCE TO RELATED APPLICATIONS

This application is a Divisional of U.S. patent application Ser. No. 11/521,656, filed Sep. 15, 2006, now U.S. Pat. No. 8,048,532 which is incorporated herein by reference in its entirety.

FIELD OF THE INVENTION

The present invention relates to the preparation of metallized, multi-layer polymeric films and to laminates made therefrom. Such films are metallized so as to have especially desirable properties when used as or in laminates for packaging, such as for food products.

BACKGROUND OF THE INVENTION

Polyolefin films are commonly used in the food and consumer product packaging industry, due at least in part to their numerous favorable properties related to this purpose. Such polyolefin films frequently are multi-layer films having a core, typically comprising polypropylene, and one or more layers of the same or different polymeric materials on either or both sides of the core. Polyolefin films of this type, however, have some limitations or drawbacks that have hampered, to a degree, the realization of their full potential as packaging materials for food products and especially perishable food products. One such limitation sometimes encountered is their lack of adequate resistance to the transmission of oxygen and/or water vapor, i.e., moisture.

An approach for improving the oxygen and/or water vapor transmission performance of polymeric films, such as those to be used for food packaging, involves the application of a barrier coating, such as a metal coating, to a polymeric surface of or in the film structure, to thereby form what may be described as a metallized film. Multi-layer polymeric films having a thin metal layer deposed on one or more of the polymeric layers of the film are known in the industry.

Metallized oriented polypropylene (OPP) films are frequently used as packaging for foods such as potato chips, crackers, and other fat-containing snack foods. The metallized films used for such comestible products commonly are laminated to film structures, such as structures that may generally be reverse printed. The lamination of the metallized film with a printed transparent film may provide a composite film structure with suitable barrier properties that also protects the ink and the metal layers within the laminated layers of the composite film structure. This lamination of metallized OPP films with a protective substrate is generally carried out via an adhesive lamination process or via an extrusion lamination process. In the case of extrusion lamination, the metallized multi-layer film being laminated has to withstand a rather significant thermal shock due to the contact with a hot, melted bonding-polymer. This thermal shock can lead to metal "crazing", i.e., microcracking of the metal, e.g., aluminum, layer within the film. Metallized films used in the preparation of laminated film structures that are prepared in this manner should therefore exhibit a combination of good barrier properties with good metal adhesion after lamination and must have adequate resistance against crazing of the metal layer which might tend to arise as a result of the extrusion lamination conditions.

One way of improving the adhesion and crazing resistance of metal deposited onto copolymer skin layers of multi-layer polyolefin films involves some surface treatment of those skin layers prior to deposition of the metal thereon during film preparation, as discussed previously herein. Surface treatment which favorably alters the surface tension characteristics of such copolymer skin layers to improve metal deposition thereon and metal adhesion thereto includes flame treatment, corona discharge treatment and/or plasma treatment.

Technological improvements in plasma treating equipment, including reduced costs and improved efficiencies related thereto, have made this treating technology more commonly used in a variety of applications, including applications such as in-vacuum chamber treatment of film layer surfaces prior to metallization. In some instances, this technology may facilitate some advantages as compared to untreated or otherwise treated, metallized OPP substrates, such as lower oxygen and moisture permeability, a more consistent barrier, and improved metal adhesion strength.

Film layer pretreatment of certain types of polymeric substrates under certain conditions may, however, also adversely affect other properties, such as adhesion of ink, adhesives, and also metal to the surfaces so treated. For example, propylene and butylene co-monomers in treated films can undergo β-scission under flame, corona, or plasma treatment. Such β-scission may generate low molecular weight oxidized materials on the film surface. A certain portion of these low molecular weight oxidized materials are not well anchored at the film surface and significant concentrations of these easily removable low molecular weight oxidized materials may cause problems with respect to reduced adhesion of ink, adhesives, and metals subsequently deposited on these treated surfaces. The proportion of the problematic, easily removed, low molecular weight, oxidized materials at the film surface is referred to as the "labile oxygen ratio" at the film surface and may be expressed as a percentage of the total weight of the oxidized material on or near the treated film surface.

Considering the competing phenomena which occur during film layer treatment prior to metal deposition and film lamination, it would be desirable to identify combinations of film materials and surface pretreatment procedures and conditions that can facilitate preparation of especially useful metallized films having improved performance properties, such as barrier properties and metal and ink adhesion properties. In particular, it would be advantageous to identify and control the film elements and film preparation elements that can maximize the beneficial effects of pre-metallization, film surface pretreatment, with respect to the ultimate barrier, metal adhesion, and metal crazing properties of the films. It may also be advantageous to understand how to control such elements to simultaneously minimize any detrimental pretreatment effects, which can also occur during the preparation and use of these metallized polymeric films.

A number of prior art references describe preparation of metallized polymeric films with copolymeric skin layers having a metal layer deposited thereon. Such films have been prepared using surface pretreatment, including plasma treatment, of polymeric copolymer layers onto which metal is to be deposited. Representative prior art patents and applications relating to this type of technology are summarized as follows:

Nassi et al; European Patent Application No. EP-A-1,634, 699; published Mar. 15, 2006 discloses production of multi-layer metallized films which include a plastic layer onto which a metal layer is deposited by vacuum evaporation. The plastic layer onto which the metal layer is deposited can comprise propylene-butylene copolymers. This plastic layer is pretreated using a combination of both flame treatment and plasma treatment prior to deposition of the metal layer.

Cretekos et al; U.S. Pat. No. 6,773,818; issued Aug. 10, 2004 discloses an oriented multi-layer film containing a core layer and a first skin layer which is metallized. The first skin layer must contain a metallocene-catalyzed propylene homopolymer or copolymer. The copolymer can include propylene-butylene copolymers or ethylene-propylene-butylene terpolymers. Exemplified are films wherein the first skin layer, prior to vacuum metallization, is subjected to varying types and degrees of plasma treatment. Such films can be laminated with a variety of protective substrates.

Scarati et al; European Patent No. EP-B-787,582; granted Jun. 4, 2003 discloses metallized polypropylene films which can be printed or laminated and which exhibit improved adhesion of the metal layer therein. Such films are formed by depositing metal onto a surface-treated copolymeric surface layer which can include copolymers of propylene with butylene and/or ethylene and which are treated to have minimized amounts of waxy oligomeric additives or residues left over from the polymerization process.

Fatica et al; U.S. Pat. No. 6,033,786; issued Mar. 7, 2000 discloses biaxially oriented, multi-layer films comprising a core layer and a bonding layer which has a flame-treated surface onto which a metal coating can be deposited. The bonding layer can comprise propylene/butene-1 copolymers containing up to 14 wt % butene. This layer is flame-treated prior to metal deposition thereon with this flame treatment said to provide superior adhesion of the metal in comparison with corona pretreatment.

It remains desirable to have a multi-layer, metallized polymeric film having improved bonding of the metal layer to the skin layer, including improved craze resistance, and improved barrier properties, as compared to prior art metallized polymer films.

SUMMARY OF THE INVENTION

In one aspect, the present invention is directed to multi-layer, metallized polymeric films. Such films may comprise a) at least one polymeric skin layer, and b) a metal layer deposited onto at least one outermost surface of this polymeric skin layer. The term multi-layer may be defined to include at least the skin layer and the metal layer. The polymeric skin layer may preferably comprise an olefin copolymer, such as a propylene-butylene random copolymer or an ethylene-propylene-butylene terpolymer, including a blend of both, with this copolymer or terpolymer containing from about 4 wt % to about 12 wt % butylenes. The term "copolymer," as used herein, may be read broadly to include polymers comprised of two or more monomers.

The polymeric skin layer is preferably conditioned or treated prior to metallization by subjecting an outermost surface thereof to plasma treatment which facilitates the deposition thereon of a strongly adhering metal layer which is preferably aluminum. The metal layer is preferably deposited to the extent of having an optical density of at least about 2.0. Such films also preferably have a co-extruded core layer comprising polypropylene associated with the skin layer.

The resulting multi-layer films exhibit a metal adhesion bond strength of at least about 100 grams/25 mm. These films will preferably also exhibit a Water Vapor Transmission Rate (WVTR) of from about 0.05 to about 0.2 g/m$^2$/24 hour, and an Oxygen Transmission Rate (OTR) of from about 5 to 20 cm$^3$/m$^2$/24 hour.

In another aspect, the present invention is directed to a process for preparing multi-layer, metallized polymeric films. Such a process may comprise: a) providing a film comprising at least one outermost polymeric skin layer including a copolymer including at least propylene and butylene; b) subjecting a surface of this exposed polymeric skin layer to plasma treatment under certain conditions; and c) depositing a metal layer onto the plasma-treated surface of the polymeric skin layer. Plasma treatment under the certain conditions facilitates metallizing the film on the treated surface, wherein the metal layer exhibits stronger adhesion to the skin layer than was possible under any of the prior art film metallization processes and structures. Preferably, as noted, a polymeric core layer comprising polypropylene will be co-extruded with the polymeric skin layer prior to metallizing the surface of the skin layer.

The polymeric skin layer essentially comprises the same type of propylene-butylene copolymers or ethylene-propylene-butylene terpolymers described above. Preferably, the propylene-butylene copolymers may also comprise a random propylene-butylene copolymer. An outermost surface of the skin layer is plasma treated, under conditions which provide a labile oxygen ratio on this treated surface of not more than about 20%. Metal, preferably aluminum, is deposited to the extent that the metal layer on the skin layer surface has a preferred optical density of from about 2.5 to about 2.9. Surprisingly, it has been determined that preparing the film to have a labile oxygen ratio of not more than about 20% can produce a metallized film having metal bond adhesion strengths in excess of about 100 gm/25 mm, with some embodiments in excess of about 200 gm/25 mm.

Plasma treatment conditions can be varied in order to realize the requisite level of labile oxygen on the polymeric skin surface prior to its metallization. Variation in plasma treatment conditions can comprise, for example, adjustment of the power input to the plasma-treating apparatus, as well as variation in the type and flow rate of the plasma-forming gas used in the plasma-treating apparatus.

In yet another aspect of the present invention, coated films or laminates can be prepared from the multi-layer, metallized films described herein. Coated films may include from about 1 wt % to about 15 wt % of a coating applied to one or both outer surfaces of the metallized film structure. In still other embodiments, laminated film structures may be prepared utilizing the subject inventive films. The laminates may comprise the multi-layer, metallized films herein which are adhesive- or extrusion-laminated to a second film at the metallized surface.

DETAILED DESCRIPTION OF THE INVENTION

The multi-layer, metallized polymeric films of the present invention are those which comprise at least one "skin" layer of polymeric material comprising butylene and which have a metal layer or coating deposited on a treated surface of that skin layer. For purposes of this invention, a "skin" layer of a film is a polymeric layer in that film wherein at least one surface of this polymeric layer is not in contact with any other polymeric layer within the film. Thus, the multi-layer films herein can comprise only a single skin layer having a thin layer of metal deposited on either or both sides thereof.

Preferably, a skin layer which is metallized in accordance with this invention will be only one of two or more distinct polymeric layers, namely a skin layer and a core layer, of typically differing composition or characteristics which make up the film. It is also possible for the multi-layer films of the present invention to comprise two distinct "skin" layers, each of which skin layers has an outermost surface which is not in contact with any other polymeric layer and which is available for receiving a layer of metal to be deposited thereon. Alternatively, the films herein may comprise two distinct "skin" layers but have only one of those skin layers suitable or desirable for having a metal layer deposed thereon. In that instance, the non-metallized skin layer of the film may be of a composition, or may be treated in a manner, which renders that non-metallized skin layer suitable for receiving printing, lamination, coating, or for heat sealing of the film to itself or to another film or to other kinds of substrates.

Most typically, the skin layer(s) will be the outermost layer(s) of a polymeric film which has an innermost or "core" layer of compositionally distinct polymeric material. The polymeric films herein may also contain additional intermediate or "tie" layers on either or both sides of the core and positioned between the skin layers and the core layer. Such core and intermediate layers, as well as second skin layers which are not to be metallized, of the polymeric films herein are described in greater detail hereinafter in the section entitled "Optional Film Layers."

Skin Layer(s)

The multi-layer films of the present invention include a skin layer that is metallized. The skin layer is treated to render it metallizable and subsequent to such treatment the skin layer may be considered a metallizable skin layer and for purposes of this invention and as the term "metallized" is used herein may be considered a metallized skin layer when the skin layer is treated to have the metal subsequently applied thereto. The skin layer(s) of the multi-layer polymeric films herein should contain one or more copolymers comprising propylene and butylene, preferably a random propylene-butylene copolymer, and/or one or more terpolymers of ethylene, propylene and butylene. Such copolymers and terpolymers can be prepared in conventional fashion via metallocene-catalyzed or Ziegler-Natta-catalyzed polymerization of appropriate combinations of monomers.

The copolymers of propylene and butylene useful in the metallizable or metallized skin layer(s) of the films of the present invention will generally contain from about 4.0 wt % to about 12 wt % of butylene, generally 1-butene, comonomer. More preferably, these propylene/butylene copolymers will comprise from about 4.0 wt % to about 8.0 wt % of the $C_4$ comonomer.

For purposes of this invention, the propylene-butylene copolymers may contain relatively minor amounts, i.e., less than about 2 wt %, of higher olefins or other comonomers and still be considered as propylene-butylene copolymers. Thus, higher olefin comonomers such as pentene-1; hexene-1; heptene-1; 4-methyl-1-pentene; and/or octene-1 can be incorporated into the propylene-butylene copolymer component of the skin layer(s). More preferably, these comonomers which are not propylene or butylene should comprise less than about 1 wt % of these copolymers.

The propylene-butylene copolymers useful in the metallizable skin layer(s) of the films herein will preferably have a melting point of from about 125° C. to about 155° C. More preferably, the melting point of such copolymers will range from about 135° C. to about 155° C.

Terpolymers of ethylene, propylene and butylene may also be used in the skin layer(s) of the films herein. In some embodiments, such terpolymers may be either random or block terpolymers. These terpolymers of ethylene, propylene and butylene useful in the skin layer(s) of the films of the present invention should, like the propylene/butylene copolymers, generally also contain from about 4.0 wt % to about 12 wt % of butylene, generally 1-butene, comonomer. Again, more preferably these ethylene/propylene/butylene terpolymers will comrpise from about 4.0 wt % to about 8.0 wt % of the $C_4$ comonomer.

The terpolymers of ethylene, propylene and butylene useful in the metallizable skin layer(s) of the films of the present invention will also generally contain from about 0.5 wt % to about 2.0 wt % of ethylene comonomer. More preferably, these ethylene/propylene/butylene terpolymers will comprise from about 0.5 wt % to about 1.5 wt % of the $C_2$ comonomer.

For purposes of this invention, the ethylene-propylene-butylene terpolymers may contain relatively minor amounts, i.e., less than 2 wt %, of higher olefins or other comonomers and still be considered as ethylene-propylene-butylene terpolymers. Thus, higher olefin comonomers such as pentene-1; hexene-1; heptene-1; 4-methyl-1-pentene; and/or octene-1 can be incorporated into the ethylene-propylene-butylene terpolymer component of the skin layer(s). More preferably, these comonomers which are not ethylene, propylene or butylene will comprise less than about 1 wt % of these terpolymers.

The ethylene-propylene-butylene terpolymers useful in the metallizable skin layer(s) of the films herein will preferably have a melting point of from about 125° C. to about 155° C. More preferably, the melting point of such terpolymers will range from about 135° C. to about 155° C.

The metallizable skin layer(s) in the films of the present invention will generally comprise at least about 75 wt % of the random propylene-butylene copolymers hereinbefore described, the ethylene-propylene-butylene terpolymers hereinbefore described or combinations, i.e., blends, of these copolymers and terpolymers. More preferably, the $C_3/C_4$ copolymers and/or the $C_2/C_3/C_4$ terpolymers will comprise from about 90 wt % to 100 wt % of the skin layer.

The metallizable skin layer(s) may also comprise other types of polymeric materials, including homopolymers, other copolymers and other terpolymers, in addition to the copolymers and/or terpolymers discussed previously that are present. Such optional polymeric components of the metallizable skin layer(s) herein include polyethylene, polypropylene, and other thermoplastic materials such as polyamides, polyesters, polyvinyls, polylactics, as well as co- and terpolymers of ethylene and ethylenically unsaturated carboxylic acids. Exemplary optional polymeric components of the skin layer(s) herein may be described in greater detail in the skin layer discussion set forth in U.S. Pat. No. 6,773,818, which patent is incorporated herein by reference. Though not often preferred, the skin layer may also optionally contain other particulate components if desired, such as fillers, pigments, antiblocks, other agents that might produce a desired surface effect on the metallized skin layer, such as a matte-like metallized surface.

Optional Film Layers

As indicated, the metallized films herein may typically comprise, in addition to one or two metallized skin layers, other layers which can include a core layer, intermediate or tie layers, and/or a second skin layer, on the opposite side of the film from the skin layer which is metallized. This optional second skin layer may be either a metallized skin layer or a non-metallized skin layer. The metallized film may also be laminated to other polymeric substrates such as other films, or to non-polymeric substrates such as foil or paper, either before or after metallization of the skin layer.

The most typical optional layer of the subject films is a core layer. A core layer preferably comprises a film-forming polyolefin, such as, for example, a polypropylene polymer, such as an isotactic propylene homopolymer (iPP), a high crystallinity propylene homopolymer, a propylene co- or terpolymer preferably made up of 90 wt % or more of propylene, high density polyethylene (HDPE), linear low density polyethylene (LLDPE), syndiotactic polypropylene (sPP), high crystallinity polypropylene, or combinations thereof. The film-forming polyolefins of the core layer may be Ziegler-Natta-catalyzed or metallocene-catalyzed.

Preferable propylene-based polymers for the core layer may generally have a melting point of $\geq 130°$ C. and a melt-flow rate (MFR) of from 0.5 to 8 g/10 min, e.g., from 1.5 to 5 g/10 min. Specific examples thereof include, but are not limited to, Fina 3371 (commercially available from TOTAL—Fina Oil and Chemical Company) and PD 4712E1 (commercially available from ExxonMobil Chemical Company). Specific high crystallinity propylene homopolymers which can be used include ADSTIF™ HA722J and ADSTIF™ HA612M, marketed by Basell and BOREALIS™ HC101BF, marketed by Borealis A/S. The contemplated ethylene polymers may generally have a melt index ranging from 0.5 to 15 g/10 min. Specific examples thereof include, but are not limited to, HDPE M-6211 and HDPE M-6030 from Equistar Chemical Company, and HD-6704.67 from ExxonMobil Chemical Company.

The core layer preferably may be coextruded with the skin layer, but in other embodiments the core layer may be laminated to the skin layer. In preferred embodiments the core layer may also be oriented with the skin layer, either monoaxially or biaxially, either sequentially or simultaneously.

Another typical optional layer for the metallized multi-layer films herein is a second skin layer which is not metallized. Such a non-metallized second skin layer may comprise any of the coextrudable, orientable film-forming resins known in the art, such as vinyl alcohols, e.g., ethylene vinyl alcohol (EVOH), and polyethylenes of the very low-density (VLDPE), low-density (LDPE), linear low-density (LLDPE), medium-density (MDPE) or high-density (HDPE) types. Other suitable film-forming resins for the non-metallized second skin layer include substantially isotactic polypropylene, substantially syndiotactic polypropylene, copolymers of propylene with ethylene and/or an $\alpha$-olefin having from 4 to 20 carbon atoms, and terpolymers of propylene with ethylene and/or butene-1 and/or another $\alpha$-olefin(s). These and other non-metallized second skin layer materials are described in greater detail in the hereinbefore referenced U.S. Pat. No. 6,773,818. The second skin layer may also provide functional benefits to the film, such as the ability to be laminated to another substrate or film, or for sealability, printability, and/or processability. The second skin layer may also comprise the polymeric components as described suitable for the first skin layer to provide a second barrier layer that may be metallized along with the first skin layer. For example, the second skin layer may comprise a random propylene-butylene copolymer.

Yet another type of optional layer in the metallized multi-layer films herein comprises one or more "tie" or intermediate polymeric layers. These are one or more polymeric layers which may be disposed between the skin layer and the core layer, and/or one or more layers which may be disposed between a metallized or non-metallized second skin layer and the core layer. A tie layer of the present film structure may comprise any of the materials disclosed hereinbefore in reference to the metallized skin layer(s), non-metallized second skin layer, or core layer.

In particular embodiments, a tie layer will be chosen to maximize compatibility with the skin layer thereon, to improve film sealability, and/or to maximize adhesion between said skin layer(s), core layer and/or other tie layers. For example, if a non-metallized second skin layer comprises, e.g., EVOH, a tie layer comprising a maleic anhydride-grafted or modified polymer may preferably be disposed between the second skin layer and the core layer. The tie or intermediate layers may also have the same polymeric makeup as an adjacent layer but may be compositionally distinct by virtue of being free of, or containing different concentrations of, other optional film components (discussed hereinafter) such as cavitating agents or pigments.

Other Optional Film Components

The metallized multi-layer films herein may also contain a wide variety of additional optional components which serve to alter film properties, performance, function, or processability. Such optional components include, for example, cavitating agents which create void spaces, and hence opacity, in the film upon orientation of the film. Other conventional film components which can optionally be utilized include pigments, colorants or opacifying agents such as iron oxide, titanium dioxide and the like; anti-blocking, anti-slip and anti-static agents such as waxes; fillers; barrier additives; antioxidants; and the like. Such optional film components can be employed in conventional concentrations for their intended function and used in the manner described in the hereinbefore referenced U.S. Pat. No. 6,773,818.

Metal Layer

After the one or both skin layers to be metallized have been subjected to appropriate surface treatment, generally in accordance with the process of this invention, the multi-layer films herein will have deposited on at least one of the skin layers having the requisite composition as described herein a thin layer comprising an elemental metal compoment. The outer surface(s) of the skin layer(s) may be metallized such as by vacuum deposition, or any other metallization technique, such as electroplating or sputtering. The metal is preferably aluminum, but may be any other metal capable of being vacuum deposited, electroplated, or sputtered, such as, for example, gold, zinc, copper, or silver. Techniques for polymeric film metallization are well known. For example, procedures for depositing a metal layer onto a polymeric film layer are described in greater detail in WO 04/091884, incorporated herein by reference.

The extent to which metal is deposited onto a polymeric film layer can be quantified by means of determining the optical density of the metallized film. Optical density is a unitless measure of the absorption of visual light by a film being tested and is determined by standard techniques. A densitometer directs a unidirectional, perpendicular light beam onto the film sample. The light that is transmitted through the film is collected, measured and logarithmically amplified. The densitometer calculates and displays an optical density value.

To determine optical density, a commercial densitometer may be used, such as a Macbeth Model TD 932, Tobias Densitometer Model TDX or Macbeth Model TD903. The densitometer is set to zero with no film specimen. A metallized film specimen is placed over the aperture plate of the densitometer with the test surface facing upwards. The probe arm is pressed down and the resulting optical density value is recorded.

Metal layer(s) may be deposited onto the metallized skin layers of the films herein to the extent that the film exhibits an optical density of at least about 2.0. More preferably, the metallized films herein may exhibit an optical density ranging from about 2.2 to about 3.2.

The tenacity with which deposited metal layers adhere to the skin layer(s) of the films herein is determined primarily by skin layer characteristics, but secondarily by application conditions. Such characteristics are, in turn, determined by both the compositional make-up of the skin layer(s) of the films as well as by the surface properties of such skin layer(s).

The tenacity of metal adhesion in the films herein can be quantified by means of measuring metal adhesion bond strength. Bond strength may be measured by sealing a film with a Low Temperature Sealing (LTS) coating (e.g., Bicor™ MB 668 from ExxonMobil Chemical Company) onto a specimen of the metallized film. A LAKO Heat Sealer is used in accordance with LAKO test method SOP-PAL-022 (Manual Tray Method). After these two films are sealed together, 2"×6" test specimens thereof are peeled apart on an Instron dynamometer using the "Seal Strength" program. A peel rate of 12 inches/minute and 180 degrees peel angle is used. The average peel force measured by the Instron may be expressed as grams/inch or grams/25.4 mm, wherein "/inch" means per inch of width of the sealed specimen, measured perpendicular to the direction of force.

The multi-layer films of the present invention will have a metal adhesion bond strength which ranges from at least about 100 grams/25 mm, and preferably from about 100 grams/25 mm to about 300 grams/25 mm. More preferably, the films herein will have a metal adhesion bond strength ranging from about 200 to about 300 grams/25 mm. Bond strengths in excess of 300 gm/25 mm may be obtained for some combinations of skin layer polymeric composition and treating conditions, though such embodiments may be cost prohibitive for many applications.

In accordance with the present invention, multi-layer metallized films having the requisite metal adhesion bond strength are realized by preparing the films in a manner such that the skin layer(s) to be metallized have certain surface characteristics prior to metallization. In particular, it has been discovered that a key factor in realizing metallized films having the requisite metal adhesion bond strength characteristics hereinbefore specified relates to the nature and amount of low molecular weight oxidized materials which are formed on the skin layer surface prior to metallization.

As indicated hereinbefore, low molecular weight oxidized materials can be generated on the surface of the skin layer(s) to be metallized herein by virtue of the effects of conventional film treatment procedures prior to metallization, such as corona discharge treatment, flame treatment and/or plasma treatment. If too high a proportion of these low molecular weight oxidized materials are not well-anchored to the skin layer surface, such relatively easily removable oxygen-containing materials may adversely effect adhesion of the metal layer subsequently deposited onto the pretreated skin layer surface.

The proportion of the problematic, relatively easily removed, low molecular weight, oxidized materials in relation to the total amount of oxidized materials present at or near the film surface is referred to herein as the "labile oxygen ratio" at the film surface. Labile oxygen ratio is determined by measuring percent of oxygen at the skin layer surface, both before and after solvent washing, using X-ray photoelectron spectroscopy (XPS) and determining from such measurements the relative amounts of before and after oxygen which is present. The film surface may be considered that portion of the film that is effected by the treatment, including primarily the actual film surface but secondarily that portion of the skin layer that is close enough to the surface to effect metal layer adhesion, such as through molecular attraction or bonding.

The preferred labile oxygen test for determining this parameter in connection with the present invention is set forth as follows: XPS measurements are obtained on a Physical Electronics, Inc., (PHI), model 5600, ESCA spectrometer, using a monochromatic "Al" source (Al Kα radiation at 1486.6 eV (electron-volts)) and a take-off angle of 45°. Spectra are referenced with respect to the C 1 s calibration level of 285.0 eV for the carbons in hydrocarbons. From the XPS spectra obtained, the Carbon, Oxygen, and Nitrogen atomic percentage is measured.

To measure labile oxygen, the surface of the skin layer of the film after pretreatment but before metallization is analyzed. The skin layer is then analyzed again after it has been washed with isopropanol. Film samples are cut large enough to obtain adequate testing area (approx. 8"×11" each) of material for surface additive testing. For solvent washing, one end of sample is held over an empty glass or metal dish, so that when the solvent is rinsed over the surface, all residue is collected in dish. The surface of sample is rinsed using approximately 250 ml of isopropyl alcohol and then dried. The surface is then analyzed again using above method. The difference between the atomic oxygen level on the original surface and the surface after solvent rinsing, divided by the total original oxygen level is the labile oxygen ratio parameter for purposes of this invention, and is expresses as a percentage.

The films of the present invention which exhibit the requisite metal adhesion bond strength may generally be those which are metallized with the skin layer(s) having a labile oxygen ratio of no more than about 20%. More preferably, the multilayer films herein comprise skin layers which have a labile oxygen ratio of from zero (0) % to about 10%, and more preferably less than about 8%. Skin layers having such labile oxygen characteristics can be realized by appropriately selecting the polymeric make-up of the skin layers and by then utilizing the preferred skin layer treatment procedures as set forth hereinafter in the "Film Preparation" section.

Film Dimensions and Barrier Properties

Although the thickness of the metallized, multi-layer films herein, and the thicknesses of the individual layers of the multi-layer film, are not critical, in certain embodiments, the metallized multi-layer film may have a total thickness ranging from 10 μm to 75 μm, e.g., from 12 μm to 25 μm. The thickness relationship of the layers may be such that the core layer constitutes from 40 to 95 percent of the total film thickness, the first skin layer and second skin layer (if present) may constitute from 1 to 15 percent of the total film thickness, and the intermediate, or tie, layer(s) (if present) may constitute from 0 to 20 percent of the total film thickness.

For example, the first and second skin layers may each range from 0.5 μm to 5 μm, e.g., from 1 μm to 3 μm, while the core layer may range from 9.5∥m to 74.5 μm, or from 10 μm to 23. In general, the core layer should be of sufficient thickness to provide the necessary bulk and processing properties, including barrier, stiffness, and the like that are desired for product protection and good performance on packaging equipment.

The multi-layer, metallized films prepared in accordance with the present invention, in addition to having desirably high metal adhesion characteristics, will generally also exhibit barrier properties which render such films suitable for use in packaging wherein such barrier properties are especially useful. Packaging utility of this type includes packaging suitable for food products wherein resistance of the films to permeability of both water vapor and oxygen (air) becomes important.

Preferably the multi-layer metallized films herein will exhibit an Oxygen Transmission Rate (OTR) within the range of from about 5 to about 20 $cm^3/m^2$/24 hour. More preferably, the films herein will have an OTR within the range of from about 5.0 to 10 $cm^3/m^2$/24 hours. Oxygen Transmission Rate is a standard parameter used to quantify certain barrier properties of polymeric films. For purposes of this invention, Oxygen Transmission Rate is determined in accordance with ASTM D 3985 at 73° F. (23° C.) and 0% relative humidity (RH).

Preferably also the multi-layer metallized films herein will exhibit a Water Vapor Transmission Rate (WVTR) of from about 0.05 to about 0.2 g/m$^2$/24 hours. More preferably, the films herein will have an WVTR within the range of from about 0.05 to about 0.1 cm$^3$/m$^2$/24 hours. Water Vapor Transmission Rate is also a standard parameter used to quantify certain barrier properties of polymeric films. For purposes of this invention, Water Vapor Transmission Rate is determined in accordance with ASTM F 1249 at 100° F. (37.8° C.) and 90% relative humidity (RH).

Coated Films and Film Laminates

A coating may optionally be applied to one or both outer surfaces of the film, preferably after metallization. This includes the outer surface of the core layer if a second skin layer is not present, the outer surface of the second skin layer, and the metallized surface of the first skin layer. The coating may serve to enhance barrier properties, printability, processability, or other performance or aesthetic properties.

The coating may be applied in an amount such that there will be deposited upon drying a smooth, evenly distributed layer that is sufficient to further enhance the, e.g., sealability and/or barrier characteristics of the final product. For example, the coating may be applied in an amount on the order of from about 0.01 to about 0.2 mil thickness, which may be roughly equivalent to 0.2 to 3.5 grams per 1000 sq. in. of film. Alternatively, the coating may be present in an amount of from 1 wt % to 25 wt %, preferably 7 wt % to 15 wt %, based on the weight of the entire film. The coating on the film may be subsequently dried by hot air, radiant heat or by any other convenient means.

Prior to the application of the coating, the film surface to be coated may be surface-treated or primed with a primer layer. An appropriate primer includes, but is not limited to, a poly(ethyleneimine) primer and an epoxy primer.

The film may also optionally be laminated to a substrate at one or both of its outer surfaces, again including the outer surface of the core layer if a second skin layer is not present, the outer surface of the second skin layer, and the metallized surface of the first skin layer. For example, the outer surface of the first skin layer may be metallized and subsequently laminated to a protective substrate. Laminating the outer surface(s) may, for many applications including packaging, labeling or imaging applications, serve to complete the structure necessary for the given application.

Examples of substrates that may be employed include, but are not limited to: a separate polymer film; a metal foil, such as aluminum foil; cellulosic webs, e.g., numerous varieties of paper such as corrugated paperboard, kraft paper, glassine, and cartonboard; nonwoven tissue, e.g., spunbonded polyolefin fiber and melt-blown microfibers; a metallizing layer; etc.

According to one embodiment of the present invention, the outer surface of the first skin layer is metallized and then laminated to a polymer film, e.g., a monolayer or multi-layer polymer film. The film laminated to the outer surface of the inventive film may include a slip surface, a seal surface, a printed surface, or a combination thereof.

For especially rigorous processes of converting the present film into a commercial article, the metallized first skin layer and/or the, e.g., printed second skin layer, are protected via lamination, such that the metallized layer and/or printed layer end up on the inside of a multi-layer film structure.

The outer surface(s) of the metallized multi-layer films herein may be laminated to a substrate by employing a suitable adhesive, e.g., a hot melt adhesive such as low density polyethylene or ethylene-methacrylate copolymer; water-based adhesives such as polyvinylidene chloride latex; solvent-based adhesives; or solventless polyethers made from two components, e.g., a polyether diol and a polyester diisocyanate.

Alternatively, the lamination may be accomplished via extrusion lamination using, e.g., an extruded polyethylene or ethylene co- or terpolymer. In certain embodiments, the outer surface may be laminated to a substrate via heat lamination, which uses heat and pressure to apply a lamination film onto a substrate and improves the durability of the substrate without the need for more expensive water-based lamination or less-desired solvent-based lamination.

Film Preparation

In general, the metallized, multi-layer films herein may be prepared by providing a polymeric film comprising at least a skin layer of the requisite polymeric composition, subjecting the outermost surface of the skin layer of the film to plasma-treating conditions which are effective to provide the requisite labile oxygen ratio at the film surface, and then metallizing the plasma-treated surface of the skin layer to form the desired metallized multi-layer film. The film which is first provided preferably has one or more polymeric layers in addition to the skin layer. This film is also preferably oriented, more preferably biaxially oriented, prior to plasma treatment.

One method of making the preferred metallized oriented multi-layer films herein comprises coextruding a melt of the requisite thermoplastic polymers through a die preferably a multi-polymeric-layer melt including at least a skin layer and a core layer, then cooling, e.g., by quenching, the multi-layer melt to form a multi-layer sheet. The multi-layer sheet is then stretched in the machine direction (MD) over a series of heated rollers traveling at a progressively increasing differential speed to form an MD oriented multi-layer film. Further stretching of the MD oriented multi-layer film may then take place in the transverse direction (TD) in a heated tenter frame to form a biaxially oriented multi-layer film. Alternatively, MD and TD orientation may be performed in the reverse order or simultaneously.

Preliminary surface treating may then be performed on the orientation apparatus on the first skin layer, core, and/or the second skin layer (if present) of the biaxially oriented multi-layer film with treatment which may preferably include, for example, corona treatment or flame treatment. The film may then be sent to a vacuum metallizing chamber which contains plasma treating apparatus wherein the skin layer is subjected to plasma treating conditions sufficient to create the requisite labile oxygen ratio at the skin layer surface. Then the plasma-treated skin layer is metallized in the vacuum metallizing chamber to form the desired metallized biaxially oriented multi-layer film. The plasma-treatment may also preferably be performed in the presence of a desired gas mixture and/or with a desired energy to provide the requisite labile oxygen level.

The requisite plasma treatment of the film preparation process herein is generally carried out in plasma-treating apparatus, i.e., a plasma treater, within which electrical energy is imparted to a plasma-forming gas flowing through the plasma treater. The effect of plasma treatment on the surface characteristics of the skin layer being treated is dependent upon the plasma-treating conditions within the plasma treater. Such conditions include such variables as the power of the plasma treater, the type of plasma-forming gas flowing though the plasma treater, and the flow rate of that gas through the plasma treater Adjustment of any or all of these variables can be carried out to arrive at plasma-treating conditions which impart to the film skin layer surface the requisite labile oxygen ratio.

Generally, the power supplied to the plasma surface treater used in the typical commercial size film preparation process as described herein may vary from about 2 kW to 8 kW. At typical commercial film processing speeds, this corresponds to an energy input to the plasma-treating procedure that ranges from about 50 to about 400 Joules per square meter ($J/m^2$). More preferably, the energy input to the plasma treating step will range from about 100 to about 250 $J/m^2$.

Preferably, the plasma-forming gas used in the plasma-treater will be a neutral gas such as nitrogen, argon and helium. An especially preferred plasma-forming gas is pure nitrogen. Another preferred plasma gas is a mixture of nitrogen with another neutral gas such as argon or helium. The plasma-forming gas used for plasma-treatment herein may also comprise a mixture of nitrogen in combination with at least one of a reactive gas such as carbon dioxide, oxygen, methane, and/or water vapor. Ternary mixtures of plasma gas may also be used. Such mixtures may include combinations of nitrogen, another neutral gas, and/or a reactive gas.

Generally, the plasma-treating conditions used herein will include using a gas flow rate through said plasma treater of from about 0.025 to about 0.125 $Nm^3$/hr. More preferably, gas flow rates of from about 0.05 to about 0.075 $Nm^3$/hr can be used. A normal cubic meter ($Nm^3$) is the metric expression of gas volume at standard conditions and is defined as being measured at 0° C. and 1 atmosphere of pressure.

The plasma treatment step in the film preparation process herein will generally serve to impart to the treated skin layer a surface tension level of at least about 35 dynes/cm. More preferably, the surface tension of the treated skin layer, prior to metallization, will range from about 38 to about 42 dynes/cm. Surface tension of such treated skin layer surfaces may be measured in accordance with ASTM Standard D2578-84. Due to the inherent difficulty with obtaining repeatable results with measuring surface tension, it is anticipated that the stated range should be observed over a statistically meaningful number of samples and measurements to determine an average value that is at least about 35 dynes/cm.

EXAMPLES

Several 3-layer co-extruded film samples were produced and biaxially oriented on a tenter frame orienter and in some instances were pretreated in the orienter. After orientation and optional pre-treatment, the film samples were passed to a vacuum metallization chamber which also contains plasma-treating apparatus. In the metallization chamber, the various test films were plasma-treated under several differing sets of conditions. Each film sample was then metallized in the vacuum chamber with an aluminum layer deposited on the skin layer surface of the film sample. These several metallized film samples were then evaluated for their metal adhesion and barrier properties. The film samples were also then further laminated to additional types of film substrates and the resulting laminate products are further evaluated.

Each film sample has the following basic structure:
Skin Layer—Clyrell RC 1601 or 3C3OFHP propylene/butylene copolymers from Basell.
Core Layer—Propylene homopolymer with 50% crystalline PP.
Sealant Layer (second skin layer)—Adsyl 5C39 polyolefin copolymer from Basell or Japan Polypropylene XPM 7794 or equivalent.

The total film gauge is about 14 μm, of which the core layer represents about 90% of the total film thickness and the skin and sealant layers each represent about 5% of the total film thickness.

Examples 1-2

A sample of a film structure is prepared according to the present invention (Example 1). A compositionally similar comparative film sample that was not prepared according to the present invention is provided as Example 2. The film of Example 2 possesses a skin structure and skin layer composition that varies slightly from Example 1 due to how Example 2 was prepared as compared to Example 1. The resin composition and method of treating the resin composition are provided in Table 1A. Table 1B provides values for the labile oxygen ratios on the surface of the skin layer of each film sample prior to metallization, demonstrating that the film products produced in Example 1 differ significantly from the film product produced in Example 2, even though the beginning resin compositions were similar. Table 1B exhibits the optical density of each film sample after metallization, and both the barrier properties and the metal adhesion bond strength for both the Example 1 (exemplary) and Example 2 (comparative) film samples.

TABLE 1A

| | | Skin Treatment | | | |
|---|---|---|---|---|---|
| | | On Orienter | | Plasma Conditions | |
| Example No. | Skin Composition | Type | Surface Tension | Gas | Power |
| #1 | 7.3% $C_4$ | Flame | 42 dynes/cm | N2 | 4 kW |
| #2 (Compare) | 7.3% $C_4$ | Flame | 44 dynes/cm | N/A* | N/A* |

*N/A = Not Available - Sample #2 was plasma treated, but in the presence of an unidentified gas composition and power conditions. Nevertheless, the more important characteristic is the labile oxygen ratio. The combination of the gas composition and the power used in comparative Example #2 produced a film that had a labile oxygen ratio of about 33%, even though the skin layer comprised a polymer having 7.3 wt % butylene. Exemplary Example #1 had a lower labile oxygen ratio and the barrier and bond strength properties of the two films is demonstrated in Table 1B.

TABLE 1B

| | Film Properties | | | | |
|---|---|---|---|---|---|
| Example No. | Labile $O_2$ Ratio | Optical Density | OTR ($cm^3/m^2$/ 24 hr) | WVTR ($gr/m^2$/ 24 hr) | Metal Adhesion |
| #1 | 20% | 2.8-2.9 | 7.83 | 0.04 | 130 g/25 mm |
| #2 (Compare) | 33% | 2.8-2.9 | 10.0 | 0.07 | 20 g/25 mm |

The data in Tables 1A and 1B indicate that preferred films prepared in accordance with the instant invention that have a skin layer labile oxygen ratio of about 20% provide adhesion of the metal layer deposited onto the skin layer surface in excess of 100 gm/25 mm and also exhibit desirable barrier properties. The comparable film of Example 2 is plasma-treated in a manner that resulted in a skin layer labile oxygen ratio of 33% and consequently demonstrated relatively poor metal adhesion and less favorable barrier properties, as compared to Example 1.

Subsequent to producing and evaluating the metallized films and related properties as disclosed in Tables 1A and 1B, additional samples of the film of Examples 1 and 2 were laminated by various lamination methods to other polymer substrates to form a variety of laminated samples. Some samples of the Example 1 and 2 films were solvent-laminated and other samples were extrusion laminated, on the metallized layer of the film. Laminations were made using each lamination method by laminating the films of Examples 1 and 2 each to a 12μ polyethlyene terephthalate (PET) film. Other samples were produced using each lamination method and laminating the films of Examples 1 and 2 to a 17μ oriented polypropylene (OPP) film. The solvent lamination method utilized Adcote 575S adhesive (with Catalyst F), available from Rohm and Haas, and the laminates were tested seven (7) days following lamination. The several laminate samples were tested for bond strength between the metal layer and the laminated substrate using the same general procedures used to determine metal adhesion bond strength. The laminate samples are also evaluated during bond strength testing for metal layer removal from the skin layer onto which it has been deposited. Results are shown in Table 1C.

TABLE 1C

| | Solvent Based Lamination | | |
|---|---|---|---|
| Example No. | Av. Bond Strength (w/PET) | Av. Bond Strength (w/OPP) | Extrusion Lamination (w/ OPP) |
| #1 | >130 g/25 mm and for some samples measurements exceeded 300 g/25 mm and with film tear. No metal transfer | >130 gm/25 mm and for some samples measurements exceeded 300 g/25 mm. No metal transfer | >100 g/25 mm. No metal transfer. |
| #2 (Compare) | <100 g/25 mm with complete metal transfer | <100 g/25 mm with ~50% metal transfer | <20 g/25 mm with complete metal transfer. |

The Table 1C testing exhibits that the laminates made from the Example 1 film samples exhibit much better adhesion and less metal transfer during de-lamination than the laminates made from Example 2 comparative film samples.

Examples 3-9

Samples of film structures according to the present invention (Examples 3-7) and comparative film samples (Examples 8-9) are prepared using the film treatment parameters set forth in Table 2A and are not laminated to any other substrates. Table 2B provides data values for the optical density of each film sample after metallization, as well as the barrier properties, and the metal adhesion bond strength for both the Examples 3-7 and the comparative Examples 8-9 film samples. Plasma treater power is in kilowatts. Film speed in the plasma treater is 5.5 msec with a film width of 2.5 meters. Plasma gas flow rate is about 500 cm³/sec.

TABLE 2A

| | | Skin Treatment | | |
|---|---|---|---|---|
| Example No. | Skin Composition | On Orienter Pretreatment Type | Plasma Conditions Gas | Power |
| #3 | 7.3% $C_4$ | None | $N_2$ + 20% argon | 2 kW |
| #4 | 7.3% $C_4$ | None | $N_2$ + 20% argon | 4 kW |
| #5 | 7.3% $C_4$ | None | $N_2$ + 0.25% $O_2$ | 4 kW |

TABLE 2A-continued

| | | Skin Treatment | | |
|---|---|---|---|---|
| Example No. | Skin Composition | On Orienter Pretreatment Type | Plasma Conditions Gas | Power |
| #6 | 7.3% $C_4$ | Flame | $N_2$ | 4 kW |
| #7 | 7.3% $C_4$ | Flame | $N_2$ + 0.25% $O_2$ | 4 kW |
| #8 (Compare) | 12.8% $C_4$ | None | $N_2$ + 0.25% $O_2$ | 4 kW |
| #9 (Compare) | 12.8% $C_4$ | Flame | $N_2$ + 0.25% $O_2$ | 4 kW |

TABLE 2B

| | | Film Properties | | |
|---|---|---|---|---|
| Example No. | Optical Density | OTR (cm³/m²/24 hr) | WVTR (gr/m²/24 hr) | Metal Adhesion (Bond Strength) |
| #3 | 2.8 | 16.3 | 0.2 | >190 g/25 mm |
| #4 | 2.8 | 18.1 | 0.14 | >160 g/25 mm |
| #5 | 2.8 | 22.9 | 0.16 | >200 g/25 mm |
| #6 | 2.8 | 10.2 | 0.21 | >200 g/25 mm |
| #7 | 2.8 | 22.0 | 0.3 | >200 g/25 mm |
| #8 (Compare) | 2.8 | 4.1 | 0.31 | <80 g/25 mm |
| #9 (Compare) | 2.8 | 28 | 0.42 | <70 g/25 mm |

The Table 2A and 2B data indicate that films prepared in accordance with the instant invention having butylene content of less than about 8 wt % demonstrate improved metal bonding to the skin layer and improved barrier performance as compared to films embodiments having butylene content in excess of 12 wt %. The Table 2A and 2B data indicate that comparative films having a butylene content in the skin layer in excess of 12 wt % could result in production of films having either undesirably low metal adhesion bond strength and/or undesirably high barrier properties.

The data in the above examples also demonstrate that increasing nitrogen content in the plasma-treating gas environment may produce a reduced labile oxygen content as compared to films produced in plasma treating gas environments having relatively high oxygen content. The data further demonstrate that flame-treating on an orienter during film production also may provide a film with desirably reduced labile oxygen content.

Samples of the Examples 3-9 films were also solvent-laminated to a 17μ, oriented polypropylene (OPP) film. The solvent lamination utilized Rohm and Haas 522A&B (with catalyst) and these laminate structures were tested seven (7) days following lamination. The several laminate samples were tested for bond strength between the metal layer and the laminated substrate using the same general procedures used to determine metal adhesion bond strength. Results are shown in Table 2C.

TABLE 2C

| Example No. | Av. Bond Strength (w/OPP) |
|---|---|
| #3 | >400 g/25 mm. |
| #4 | >500 g/25 mm. |
| #5 | >480 g/25 mm |
| #6 | >220 g/25 mm |
| #7 | >200 g/25 mm |

TABLE 2C-continued

| Example No. | Av. Bond Strength (w/OPP) |
| --- | --- |
| #8 (Comparative) | <80 g/25 mm |
| #9 (Comparative) | <50 g/25 mm |

The Table 2C data exhibits that films of the present invention, that is films having a higher $C_4$ content in the skin layer that is metallized, and that are properly plasma treated may exhibit desirably improved metal layer bond strengths as compared to films having higher butylene content in the skin layer or that are not properly plasma treated. Maintaining a labile oxygen content of less than about 20 wt % is most desirable to produce a polymer film having an improved labile oxygen content and corresponding metal layer bond strength.

While preferred embodiments and examples of the invention have been disclosed herein, it will be understood that various modifications can be made without departing from the scope of the invention. Should the disclosure of any of the patents and/or publications that are incorporated herein by reference conflict with the present specification to the extent that it might render a term unclear, the present specification shall take precedence.

What is claimed is:

1. A process for preparing a multi-layer, metallized polymeric film, which process comprises:
   a) providing a film comprising at least one outermost polymeric skin layer comprising a propylene-butylene random copolymer having a butylene content of from about 4.0 wt % to about 12.0 wt %;
   b) subjecting said outermost surface of said at least one outermost polymeric skin layer to plasma treatment under plasma treatment conditions which provide a labile oxygen ratio on said treated surface of no more than about 20%, wherein said plasma treatment is carried out by treating said polymeric skin layer using a plasma treater within which electrical energy is imparted to a selected gas, wherein said selected gas comprises at least 90 wt % nitrogen and an energy input that ranges from about 50 to about 400 joules per square meter, and using a gas flow rate of from about 0.025 to about 0.125 normal-meters cubed per hour; and
   c) depositing a metal layer onto said plasma-treated surface of said polymeric film layer to the extent that said metal layer has an optical density of at least about 2.0.

2. The process according to claim 1, wherein the polymeric film so prepared exhibits a metal adhesion bond strength of at least about 100 grams/25 mm.

3. The process according to claim 1, wherein said film further comprises a polymeric core layer in addition to said at least one outermost polymeric skin layer.

4. The process according to claim 3, wherein said polymeric core layer is co-extruded with said at least one outermost polymeric skin layer and the core layer comprises polypropylene.

5. The process according to claim 1, wherein said multi-layer film is biaxially oriented.

6. The process according to claim 1, wherein said at least one outermost polymeric film layer comprises a propylene-butylene random copolymer having a butylene content of from about 4.0 wt % to about 8.0 wt %.

7. The process according to claim 6, wherein said propylene-butylene random copolymer has a melting point of from about 125° C. to about 155° C.

8. The process according to claim 1, wherein said at least one outermost polymeric skin layer is plasma-treated to provide thereon a surface tension of at least about 35 dynes/cm and a labile oxygen ratio of equal to or less than about 10%.

9. The process according to claim 1, wherein said plasma-treating conditions include an electrical energy input supplied to said plasma surface treater of from about 100 to about 250 Joules per square meter.

10. The process according to claim 1 further comprising the step of treating said outermost surface of the at least one polymeric film with at least one of flame treating and corona discharge treating, prior to plasma-treating the film as per step b).

11. The process according to claim 10, wherein the polymeric skin layer is an oriented layer and the step of treating the surface of the skin layer is performed subsequent to orientation of the skin layer in at least one direction.

12. The process according to claim 1, wherein said metal layer is vacuum deposited onto said plasma-treated surface of said polymeric film layer to the extent that said metal layer has an optical density of from about 2.2 to about 3.2.

13. The process according to claim 1, wherein said metal deposited on said plasma-treated surface of said polymeric film layer is aluminum.

14. The process according to claim 1 which comprises the further step of laminating the multi-layer, metallized polymeric film to a second film.

15. The process according to claim 14 which comprises the further step of laminating the prepared multi-layer, metallized polymeric film at the metallized surface to a second film.

16. The process according to claim 1, wherein said multi-layer, metallized polymeric film exhibits a Water Vapor Transmission Rate of from about 0.05 to about 0.2 g/m²/24 hour, an Oxygen Transmission Rate of from about 5 to about 20 cm³/m²/24 hour, and a metal adhesion bond strength of at least about 100 grams/25 mm.

17. The process according to claim 1 applying a coating to one or both outer surfaces of said multi-layer film, wherein the coating comprises from about 1 wt % to about 25 wt % of the total weight of the coated film.

18. The process according to claim 1, wherein the gas also comprises 0.25 wt % or less of a reactive gas.

* * * * *